United States Patent [19]

Aya et al.

[11] Patent Number: 4,831,104

[45] Date of Patent: May 16, 1989

[54] THERMOPLASTIC AROMATIC POLYAMIDEIMIDE COPOLYMER FROM POLYAMIDE DIAMINE

[75] Inventors: Toshihiko Aya; Sho Kadoi, both of Nagoya, Japan

[73] Assignee: Toray Industries, Inc., Tokyo, Japan

[21] Appl. No.: 80,630

[22] Filed: Jul. 31, 1987

Related U.S. Application Data

[63] Continuation-in-part of Ser. No. 828,312, Feb. 11, 1986, abandoned.

[30] Foreign Application Priority Data

Feb. 25, 1985 [JP] Japan .................................. 60-34537

[51] Int. Cl.$^4$ ............................................ C08G 73/14
[52] U.S. Cl. ........................ 528/184; 525/432; 525/436; 528/44; 528/125; 528/128; 528/172; 528/173; 528/185; 528/229; 528/327; 528/329.1; 528/331; 528/350
[58] Field of Search ............ 528/184, 125, 128, 172, 528/173, 229, 327, 329.1, 331, 350, 185, 44; 525/432, 436

[56] References Cited

U.S. PATENT DOCUMENTS 3,984,375 10/1976 Frost .................................... 528/184

*Primary Examiner*—Harold D. Anderson
*Attorney, Agent, or Firm*—Austin R. Miller

[57] ABSTRACT

The thermoplastic aromatic polyamideimide compolymers comprising the structural units (1), (2) and (3) represented by formulae,

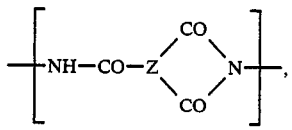

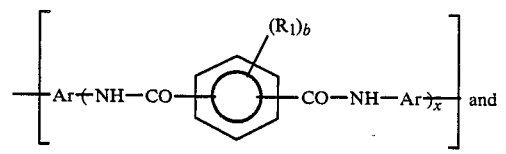 and

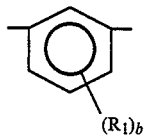

respectively, (2) and (3) being at ratio of 1 mole to 1 mole of (1), (3) being at a ratio of 0.95–0.05 mole to 0.05–0.95 mole of (2), (1) and (2) or (3) being alternatively interconnected and Ar and Ar' being composed of 5 to 70 mole % of and 95 to 30 mole % of

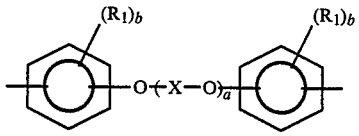

provide the moldings being superior in heat stability and fluidity at the temperatures of 300° to 400° C. and injection moldable and having desired characteristics.

15 Claims, No Drawings

THERMOPLASTIC AROMATIC POLYAMIDEIMIDE COPOLYMER FROM POLYAMIDE DIAMINE

CROSS REFERENCE TO RELATED APPLICATION

This application is a continuation-in-part application of application Ser. No. 828,312, filed 2/11/86, now abandoned.

FIELD OF THE INVENTION

The present invention relates to the thermoplastic aromatic polyamideimides (hereinafter called PAI) being superior in heat stability and fluidity at temperatures of 300° to 400° C., being injection-moldable and having desired characteristics.

BACKGROUND OF THE INVENTION

It has already been known well that the aromatic PAI copolymers being superior in heat resistance are generally obtainable by polycondensing an aromatic tricarboxylic acid anhydride or a derivative thereof and an aromatic diamine or a derivative thereof (e.g., Japanese Laid-Open Pat. Nos. 15637/1967, 19274/1969, 2397/1970, 4077/1974, 33120/1975, etc.).

Further a number of proposals have already been advanced as to the modifications of basic PAI copolymers by using an aromatic tricarboxylic acid anhydride or a derivative thereof and an aromatic dicarboxylic acid dichloride as acid components (e.g., Japanese Laid-Open Pat. Nos. 8894/1975, 121397/1975, 16908/1971, 12594/1974, 13240/1974, 26316/1074, 510882/1981, etc.). And it is also well known that special aromatic PAI copolymers having components A and B (Ar— simplex material) according to the present invention are synthesized by the reaction between a trimellitic acid monochloride anhydride and an amide-bond incorporating aromatic diamine represented by general formula:

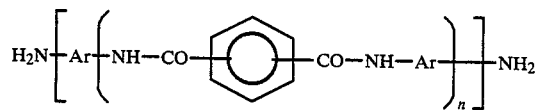

wherein Ar is

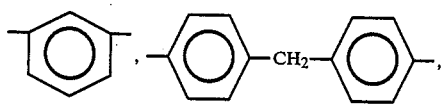

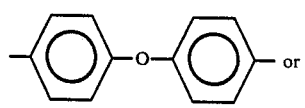

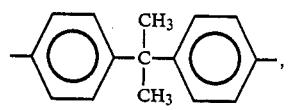

and n is an integer from 1 to 500 (e.g., U.S. Pat. No. 3,984,375 and Japanese Laid-Open Pat. No. 10029/1973).

Japanese Laid-Open Pat. No. 13240/1974 discloses PAI copolymers wherein —Ar— is a simplex material synthesized by a process consisting of the first step of the production of

(these compounds are generally called aramidediamine hereinafter) by the reaction of an excess mole diamine and

and the second step of the reaction between the above-obtained aramidediamine,

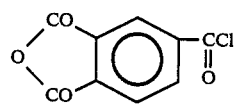

and H$_2$N—Ar—NH$_2$ and the third step of the ring closure reaction of the resultant product. Also Japanese Laid-Open Pat. No. 8894/1975 discloses a polyamide amic acid (ring-open precursor of PAI) synthesized by using two or three —Ar— units in the same manner for developing a functional film.

But the heat stability, melt fluidity and other physical properties of the aromatic PAI copolymers generally proposed hitherto are not well balanced when they are melt-molded.

For example the PAI copolymers represented by the general formula:

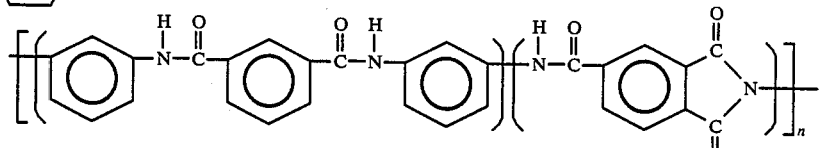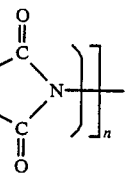

that are synthesized from trimellitic acid chloride anhydride and 3',3''-diaminoisophthalanilide are far from practicable as an engineering plastic material because the resulting moldings are inferior in stiffness and mechanical strength despite their heat resistance being enough for practical use. The PAI copolymers synthesized by using:

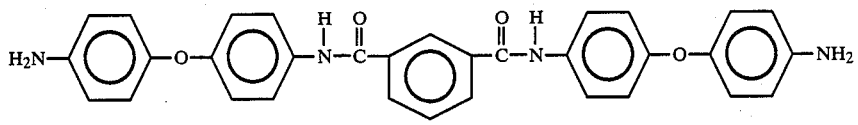

or

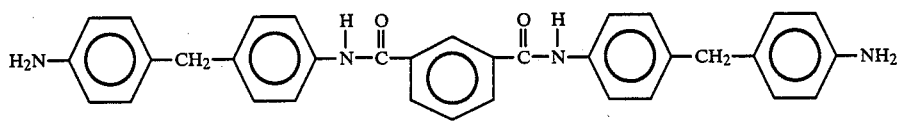

instead of aramidediamine:

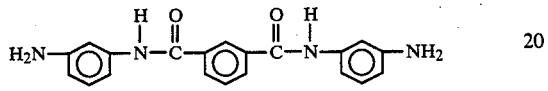

as diamine materials are not substantially moldable by any screw-in-line type injection molding machine because of inferior heat stability on melting. And the PAI copolymers synthesized from:

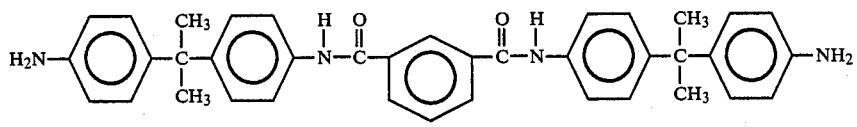

and a trimellitic acid chloride anhydride can only produce moldings inferior in mechanical strength, although they barely permit melt-molding. Moreover the polymer disclosed in Japanese Laid-Open Pat. No. 8894/1975 is a ring-open precursor of PAI copolymers, and cannot substantially be used for melt-molding because condensation water is generated in great quantities on heat-melting.

U.S. Pat. No. 3,984,375 also describes that copolymers containing two or more of radicals given the above may be particularly valuable in some instance. But there are so many combinations containing two or more radical and it doesn't make clear what kinds of combinations have valuable properties concretely.

SUMMARY OF THE INVENTION

A purpose of the present invention is to obtain aromatic PAI copolymers superior in melt-moldability because of their high heat stability and fluidity at temperatures of 300° to 400° C. and providing well-balanced physical properties for molding by solving the problems of conventional ones described above. Another purpose is to copolymerize a specific aramidediamine with another one and/or an usual aromatic diamine.

Namely the thermoplastic aromatic polyamideimide copolymers according to the present invention comprise structural units represented by formula:

$$\left[-NH-CO-Z\begin{array}{c}CO\\ \diagdown\\ \diagup\\ CO\end{array}N-\right] \quad (1)$$

$$\left[-Ar-NH-CO-\underset{(R_1)_b}{\underset{|}{\bigcirc}}-CO-NH-Ar-\right]_n \quad (2)$$

and $$-\{Ar'\}- \quad (3)$$

(2) and (3) being at a ratio of 1 mole to 1 mole of (1), (3) being at a ratio of 0.95-0.05 mole to 0.05-0.95 mole of (2) respectively, (1) and (2) or (3) being alternately interconnected and Ar and Ar' being composed of 5 to 70 mole % of a bivalent residual group (Ar$_1$) represented by formula $$\underset{(R_1)_b}{\bigcirc}$$

and 95 to 30 mole % of a bivalent residual group (Ar$_2$) represented by formula $$\underset{(R_1)_b}{\bigcirc}-O-(X-O)_a-\underset{(R_1)_b}{\bigcirc}$$

wherein Z is a trivalent aromatic group having two of its three carbonyl groups being attached to adjacent carbon atoms, X is $$-\bigcirc- \quad , \quad -\bigcirc-\bigcirc- \quad , \text{ or}$$

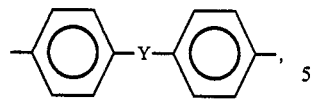

Y is a direct bond or

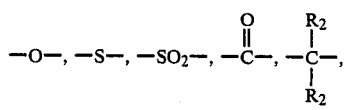

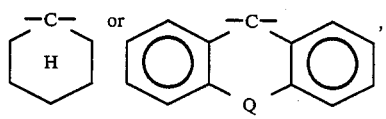

$R_1$ is a methyl group, $R_2$ is an alkyl group having 1 to 4 carbon atoms, a fluorine-substituted alkyl group or a phenyl group, Q is a direct bond or —CO—, —O—, —S— or —CH$_2$—, a is 0 or an integer from 1 to 4, b is 0, 1 or 2, and n is an integer from 1 to 500, and have flexural strength more than 600 kg/cm$^2$ as molded, melt viscosity less than $10^6$ poise measured at the shear rate of $10^3$ sec$^{-1}$ and at the temperature of 360° C.

The thermoplastic PAI copolymers according to the present invention are mainly composed of the three units represented by formulae (1), (2) and (3), components (1) and {(2)+(3)} being at a substantially-equal molar ratio, component (1) and (2) or (3) being alternately interconnected, and components (2) and (3) as diamine residual groups being at a ratio of 0.05-0.95 mole to 0.95-0.05 mole.

The component Ar and Ar' of units (2) and (3) is composed of mixture of 2 components having following structures and ratios.

| | | |
|---|---|---|
| Ar$_1$: 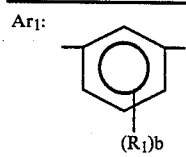 | | 5-70 mole % |
| Ar$_2$: 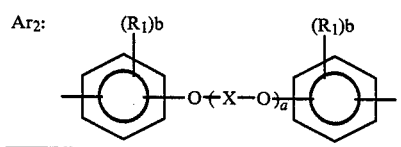 | | 95-30 mole % | wherein X, $R_1$, a and b are as mentioned above.

Unit Ar$_1$ of Ar and Ar' should not exceed 70 mole %. Otherwise the PAI copolymers obtained will conspicuously decrease in stiffness and mechanical strength. Unit AR$_2$ of Ar and Ar' should not exceed 95 mole %. Otherwise the PAI copolymers obtained will conspicuously decrease in melt-moldability, heat characteristic or mechanical strength. Accordingly the ratios Ar$_1$ and Ar$_2$ should be selected out of 5 to 70 mole %, preferably 15 to 60 mole %, and 95 to 30 mole %, preferably 85 to 40 mole % respectively.

Z materials of unit (1) mentioned above are the trivalent aromatic groups having two of three carbonyl groups attached to adjacent carbon atoms, and may be

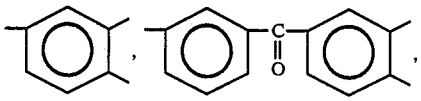

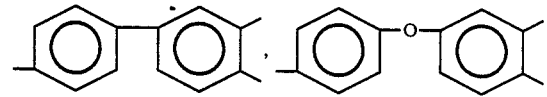

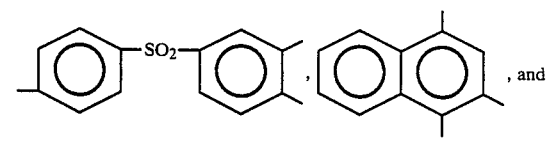

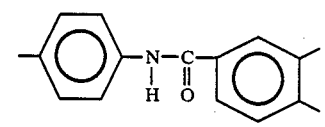

for example.

Further the thermoplastic aromatic polyamideimide copolymers according to the present invention can include unit (1)'

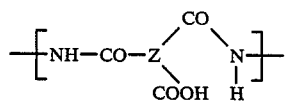

at the stage of an amic acid bond as a ring-open precursor of imide bond in an amount less than 50 mole %, preferably less than 30 mole %, of unit (1).

The examples of

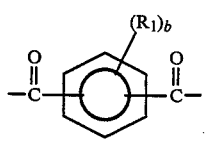

of unit (2) include

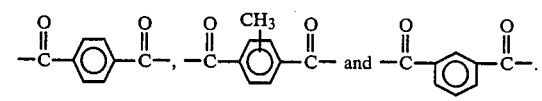

The examples of unit Ar$_1$ include

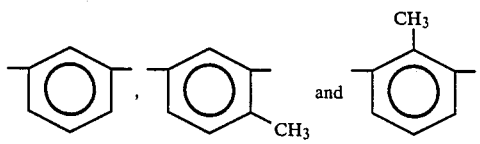

The examples of unit Ar$_2$ include

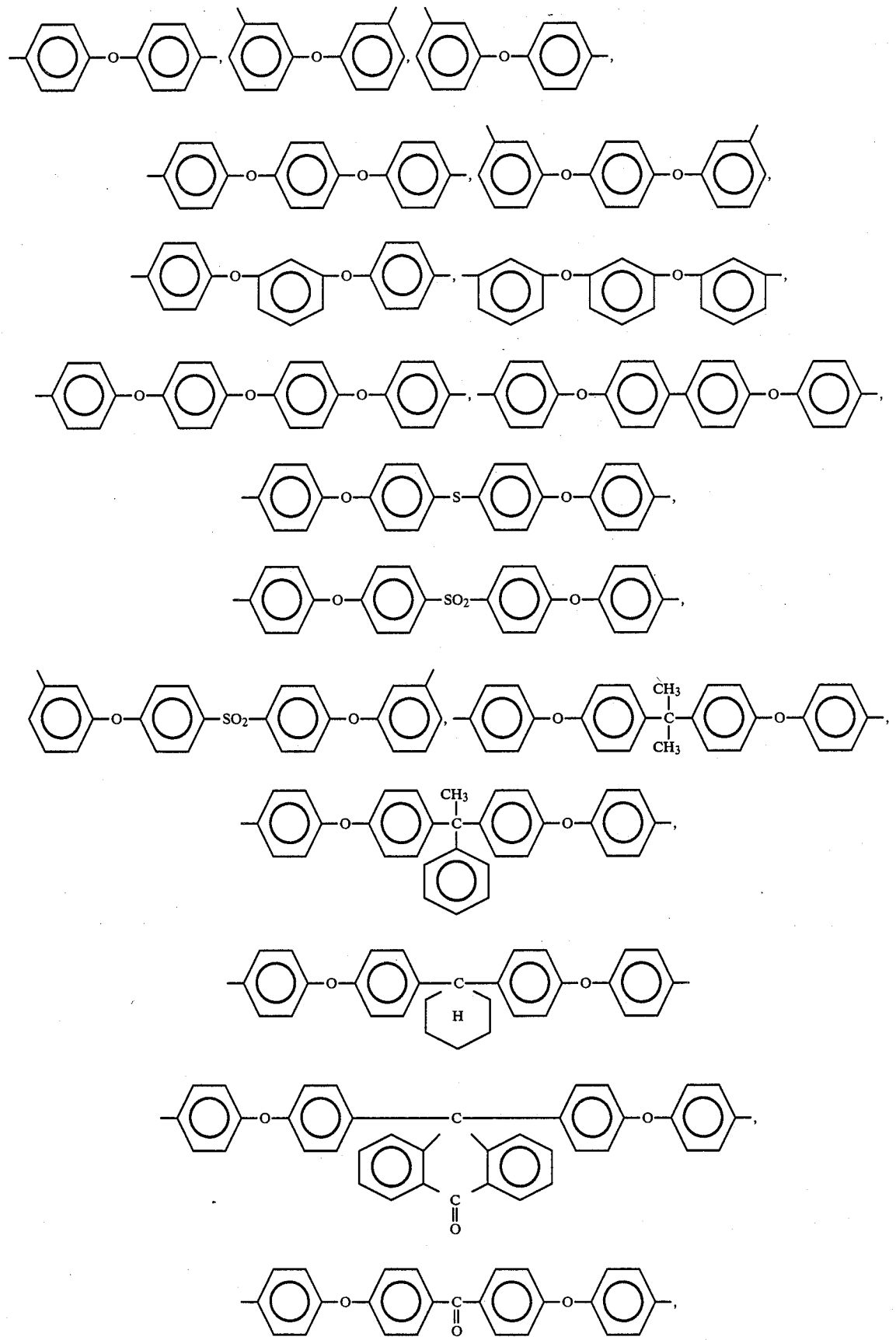

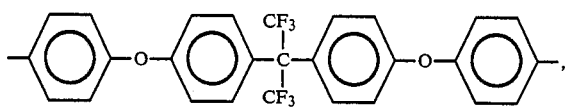

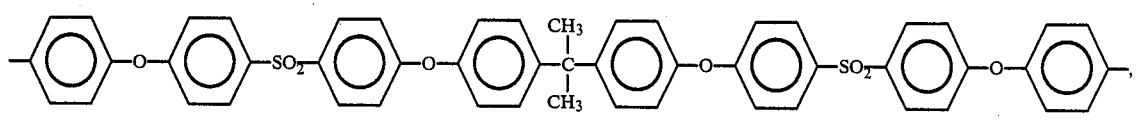

and

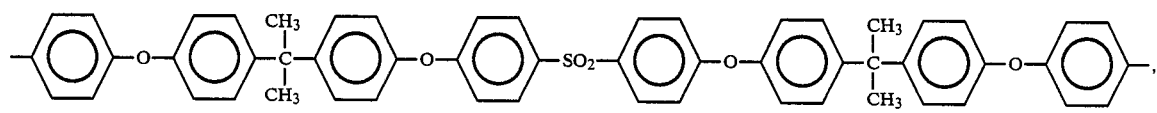

as well as their side ring substituted derivatives.

The examples of unit (2) composed of units

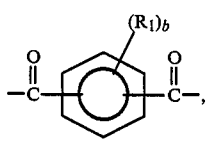

Ar₁ and Ar₂ mentioned above may be:

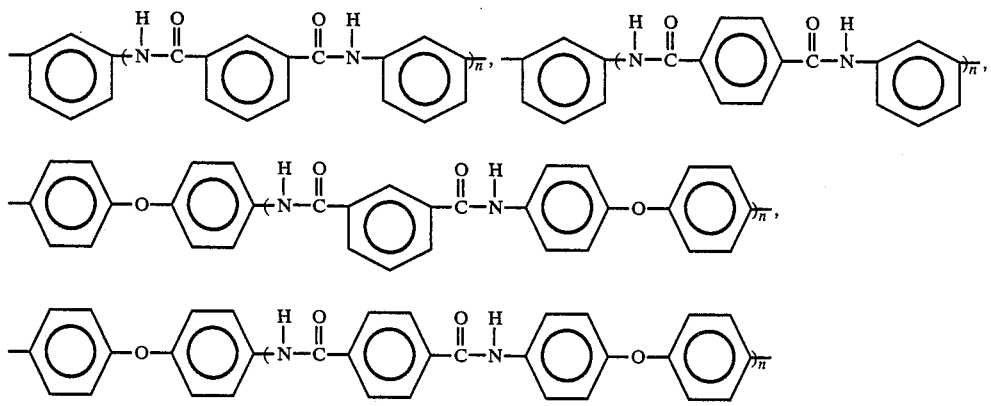

wherein n is from 1 to 500, preferably from 1 to 10, more preferably from 1 to 4. They may be used mixedly if necessary under Ar₁/Ar₂ composition conditions mentioned above. Particularly those having n=1 are useful.

The PAI copolymers according to the present invention are producible by using any of a number of hitherto-proposed general production processes. The following three processes may be cited as representative highly-practicable ones.

(1) Isocyanate process

The reaction of an aromatic diisocyanate with an aromatic tricarboxylic acid anhydride or imide dicarboxylic acid being synthesized from an aromatic tricarboxylic acid anhydride and an aromatic diamine (2/1 mole ratio) (e.g., Japanese Laid-Open Pat. Nos. 19274/1969, 2397/1970, 33120/1975, etc.).

(2) Acid chloride process

The reaction of an aromatic tricarboxylic acid monochloride anhydride and an aromatic diamine (e.g., Japanese Japanese Laid-Open Pat. No. 15637/1967, etc.)

(3) Direct polymerization process

The direct reaction of an aromatic diamine with aromatic tricarboxylic acid or a derivative thereof (excl. acid chloride derivative) in the presence of a dehydration catalyst in a polar organic solvent (e.g., Japanese Laid-Open Pat. No. 4077/1974).

The acid chloride process is most recommendable among the aforementioned processes because of their advantages of easy preparation of raw materials and of highly-linear (less-branching structure) PAI copolymers of high degree of polymerization being readily obtainable. The acid chloride process for producing the PAI copolymers according to the present invention will be described hereinafter. First, dissolved in an organic polar solvent is 1 mole of an aromatic tricarboxylic acid monochloride anhydride, and 0.9 to 1.1 mole of a diamine mixture being composed of 5 to 100 mole % of an aromatic diamine represented by formula I:

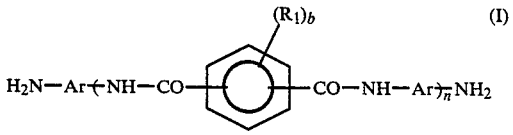

and 95 to 0 mole % of an aromatic diamine represented by formula II:

wherein Ar and Ar' is a composed of 5 to 70 mole % of

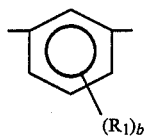

and 95 to 30 mole % of

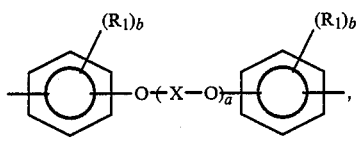

X being

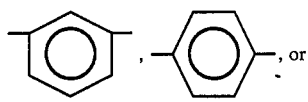, or

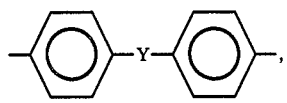,

Y being a direct bond, —O—, —S—, —SO$_2$—,

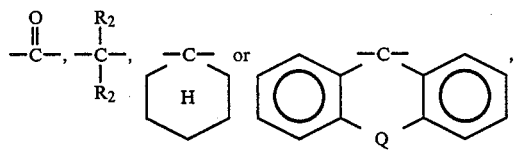

$R_1$ is a methyl group, $R_2$ is an alkyl group having 1 to 4 carbon atoms, a fluorine-substituted alkyl or phenyl group, Q is a direct bond, —CO—, —O—, —S— or —CH$_2$—, a is 0 or an integer from 1 to 4, b is 0, 1 or 2, and n is an integer from 1 to 500.

Next the resultant mixture is agitated from about 0.5 to 1 hour at the temperatures of −20° to 80° C. and its polymerization reaction is accelerated by adding about 0.8 to 1.2 mole of a hydrogen chloride scavenger if necessary. The reaction is complete in 0.5 to 10 hours. The copolymer produced at this stage is a so-called polyamide amic acid obtained by converting the greater part (e.g., 50 to 100%) of unit (1) of the PAI copolymers according to the present invention into a ring-open precursor amide amic acid unit:

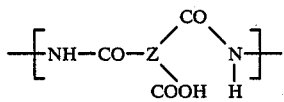

The organic polar solvents to be used for this first step include, N,N-dialkyl carboxylic acid amides such as N,N-dimethylacetoamide, N,N-diethylacetoamide and so forth; hetero cyclic compounds such as N-methylpyrrolidone, tetrahydrothiophene-1,1-dioxide, 1,3-dimethyl-2-imidazolidinone and so forth; and phenols such as cresol, xylenol and so forth. Particularly preferable thereamong are N-methylpyrrolidone and N,N-dimethylacetoamide. The hydrogen chloride scavengers to be added if necessary at the first step include aliphatic tertiary amines such as trimethylamine, triethylamine, tripropylamine and tributylamine; cyclic organic bases such as pyridine, lutidine, collidine and quinoline; and organic oxide compounds such as ethylene oxide and propylene oxide.

The polyamide amic acid obtained at the first step undergoes the second dehydration ring-closure step for its conversion into polyamideimide copolymers according to the present invention. The ring closure reaction of dehydration is performed by a liquid-phase process or solid-phase process. The former is divided into a chemical dehydrator process and simple heating process. The chemical dehydrator process is performed by using aliphatic acid anhydrides such as acetic anhydride and propionic anhydride; P$_2$O$_5$; and other chemical dehydrators at the temperatures of 0° to 120° C., preferably 10° to 60° C. The latter is performed by heating a polyamide amic acid solution at temperatures of 50° to 400° C., preferably 100° to 250° C. Therein the combination use of the azeotropic solvents useful for water removal such as benzene, toluene, xylene, chlorobenzene and so forth is effective. For the solid-phase process, a polyamide amic acid polymer is separated from a polyamide amic acid solution obtained at the first step and next heat treated in solid state. The liquid which is miscible with a reaction mixture solvent but in which polyamide amic acid is not soluble, e.g., water, methanol or like, is used as precipitant for separating a polyamide amic acid polymer. In the solid-phase heat treatment, proper conditions are generally selected out of the temperatures from 150° to 400° C. and the time from 0.5 to 50 hours for securing sufficient ring closure percentage and melting fluidity. Treatment should not be continued at 250° to 400° C. for an excessively-long time. Otherwise the polymer itself will form a 3-dimensional bridging structure to considerably decrease in melting fluidity.

Aromatic diamines (I) and (II) are obtained by attaching amino groups (—NH$_2$) on both sides of the bivalent aromatic residual groups of units (2) and (3) according to the present invention.

A typical example of aromatic diamine (I),

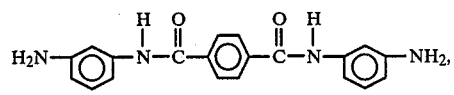

can be synthesized by a process consisting of producing

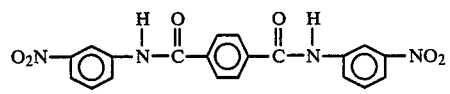

by the reaction between

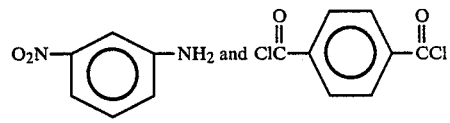

at a mole ratio of 2/1 in the presence of an acid scavenger and hydrogen-reducing this dinitro compound in the presence of Raney nickel. Aromatic diamine (I) can be also synthesized by the reaction between

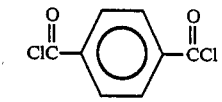

and a considerable excess of

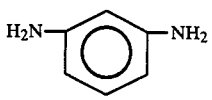

and the recovery and purification of the resultant product. A multi-component mixture of aromatic diamine (I) represented by general formula

wherein n is an integer from 1 to 500 is obtained by the reaction between

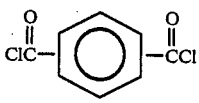

and excess mole of H₂N—Ar—NH₂ in a polar solvent.

The PAI copolymers according to the present invention are obtainable by the production processes described heretofore. Copolymerizable materials other than units (1), (2) and (3) components can be used in combination for a reaction system in such quantities as to prevent the considerable decrease in melt-moldability and physical characteristics of the PAI copolymers to be produced according to the present invention.

Most of the imide units of the aromatic PAI copolymers according to the present invention have a closed ring structure, although part of the imide unit remains an open ring amic acid bond in some cases. These PAI copolymers are high molecular weight polymers having a logarithmic viscosity ($\eta$inh) more than 0.20, preferably more than 0.25 measured at a concentration of 0.5% by weight and at a temperature of 30° C. in a N-methylpyrrolidone solvent, and can be used for the following various purposes.

Compression molding is generally performed at the temperatures of 300° to 400° C. and at the pressures of 50 to 500 kg/cm² after dry blending into the powder of the PAI copolymers according to the present invention another kind of polymer, an additive, a filler, a reinforcer or like if necessary. Extrusion or injection molding is performed at the temperatures of 300° to 400° C. supplying a dry blending mixture of a PAI copolymer according to the present invention with another kind of polymer, an additive, a filler, a reinforcer or like or a pellet thereof produced by using an extruder to a molding machine. Particularly the aromatic PAI copolymers according to the present invention are suitable for extrusion or injection molding because their heat stability and melt fluidity are balanced very well at the temperatures of 300° to 400° C. Melt viscosity is a good indicator of melt-moldability and melt viscosities of the PAI copolymers according to the present invention are less than $10^6$ poise measured at the shear rate of $10^3$ sec$^{-1}$ and at the temperature of 360° C. If melt viscosity of the PAI is more than $10^6$ poise, it is hard to extrude or mold the PAI by melt process.

Moldings of the PAI copolymers according to the present invention have good flexural strength of more than 600 kg/cm² preferably more than 800 kg/cm², more preferably more than 1000 kg/cm² as molded. Moldings improved more in heat deflection temperature, tensile strength, flexural strength, frictional wear resistance and other physical properties are obtainable by heat treating the heat melt-moldings of the PAI copolymers according to the present invention at high temperatures more than 200° C. and less than their glass transition temperature, particularly more than 220° C. and less than (the glass transition temperature −5° C.), for more than 5 hours, particularly for more than 10 hours. Heat treatment temperature should not preferably exceed the glass transition temperature. Otherwise they will show a tendency of deformation to affect their practicability. Heat treatment apparatuses are not limited, and an ordinary electric heating oven is sufficient for achieving its purpose.

For manufacturing the films and textiles of the thermoplastic aromatic polyamideimide copolymers according to the present invention, a polymerization finish solution is applicable to dry or dry and wet type extruding processes. And melt-molding is also possible after, if necessary, adding an appropriate additive to separated dry polymers. Laminated boards are manufactured through a process consisting of impregnating a cloth or mat made from a glass, carbon, asbestos or other fiber with a polymer solution, obtaining a prepreg by dry/heat hardening of the resultant impregnated body and pressing it at the temperatures of 200° to 400° C. and at the pressures of 50 to 300 kg/cm².

Paints of the thermoplastic aromatic polyamideimide copolymers according to the present invention are produced by a process consisting of mixing a solvent to a polymerization finish solution if necessary and controlling the concentration of the resultant mixture for their practical use.

The PAI copolymers according to the present invention are permitted to contain fillers such as (a) wear resistance improvers—graphite, carborundum, silica powder, molybdenum disulfide, floroesins, etc., (b) reinforcers—glass fiber, carbon fiber, boron fiber, silicon carbide fiber, carbon whisker, asbestos fiber, asbestos, metal fiber, etc., (c) imflammability improvers—antimony trioxide, magnesium carbonate, sodium carbonate, etc., (d) electric characteristic improvers—clay, mica, etc., (e) tracking resistance improvers—asbestos, silica, graphite, etc., (f) acid resistance improvers—barium sulfate, silica, calcium methasilicate, etc., (g) heat conductivity improvers—the powder of iron, zinc, aluminum, copper and other metals, (h) others—glass beads, glass balls, sodium carbonate, alumina, talc, diatomaceous earth, hydrate alumina, mica, shirasu balloon, asbestos, various metal oxides, inorganic pigments and other synthetic and natural compounds being stable at the temperatures more than 300° C.

The PAI copolymers according to the present invention are superior in melt-moldability because of their high heat stability and melt fluidity, provide well-balanced physical properties for their moldings and permit the efficient production of high-performance materials and moldings by extrusion or injection molding method.

For example, PAI copolymers composed of the structural units (1), (2) and (3) represented by

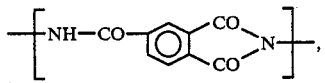

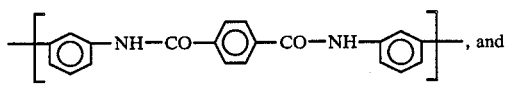, and

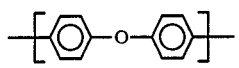, (1), (2) and (3) being at a molar ratio of 100/30/70 are considerably-superior to the conventionally-known ones being composed of only structural units (1) and (2) or (1) and (3) in melting heat stability and melting moldability. They permit injection or extrusion molding because of their high heat stability and melt fluidity at temperatures of 300° to 400° C.

Further the present invention is capable of providing moldings having exceptionally-well balanced superior physical properties—a heat deflection temperature more than 287° C., a flexural strength more than 2,320 kg/cm² and Izod impact strength more than 15 kg.cm/cm notched—after heat treatment.

The materials and moldings of the PAI copolymers according to the present invention are extensively used for manufacturing electric and electronic, aircraft and space unit, automotive, office machinery and other parts.

EMBODIMENTS

The present invention will be described in further detail in connection with the examples and comparative examples below. The logarithmic viscosity ($\eta$inh) as the criterion of a molecular weight of polymers was measured at a concentration of 0.5% in a N-methyl-2-pyrrolidone solvent and at a temperature of 30° C. Their glass transition temperature Tg was measured by using an IB type DSC apparatus manufactured by Perkin Elmer.

The following methods were used for measuring physical properties.

Flexural strength (FS): ASTM D790-71
Heat deflection temperature (HDT): ASTM D648-72 (max. fiber stress=18.56 kg/cm²)
Melt viscosity ($\mu$a) was measured by the Koka type flow tester which is a plunger extruding plastometer. Several measurements were done for one kind of polymer with variation of pressure from 50 to 350 kg/cm² under condition of temperature at 360° C. and nozzle of 1 mm$\phi$×2 mmL.

Melt viscosity values of one kind of polymer were plotted vs. shear rate, and the melt viscosity at shear rate of $10^3$ sec$^{-1}$ was read.

PRODUCTION EXAMPLE 1

Synthesis of terephthaloyl-m-aminoanilide (TMAA)

Dissolved in 3 lit. of N,N-dimethylacetoamide was 276.3 gr. (2 mole) of m-nitroaniline and 202.4 gr. (2 mole) of triethylamine. 203 gr. (1 mole %) of the fine particles of terephthalic acid dichloride (TPC) was added to the resultant solution being cooled in an ice bath at such a rate that its internal temperature does not exceed 30° C., and the resultant mixture was stirred continuously for 1 hour until reaction was completed. Next, triethylamine hydrochloride salt crystallized in the reaction system was removed by filtration and the resultant mother liquor was thrown into the great quantities of water for precipitating a product. It was subjected to filtration and washing/drying, dissolved in a N,N-dimethylformamide solvent, and purified by recrystallation to obtain 333 gr. of high-purity terephthaloyl-m-nitro-anilide (yield 82%). Next it was reduced by hydrogen in the presence of Raney nickel catalyst in an ethanol/$\gamma$-butylolacton (10/1 ratio by weight) mixture solvent to obtain TMAA having a purity of 99.2% at a yield of 79% (melting point 291° to 295° C.).

PRODUCTION EXAMPLE 2

Synthesis of isophthaoloyl-m-aminoanilide (IMAA)

The IMAA having a purity of 99.5% was synthesized in the same manner as production example 1 except using an isophthalic acid dichloride (IPC) instead of TPC (melting point 239°-240° C.).

PRODUCTION EXAMPLE 3

Synthesis of isophthaloyl-4-(p-aminophenoxy) anilide (IPEA)

The IPEA having a purity of 98.7% was synthesized in the same manner as production example 1 except using 460.3 gr. (2 mole) of 4-amino-4'-nitrodiphenyl ether instead of 276.3 gr. (2 mole) of m-nitroaniline.

EXAMPLES 1 TO 4 AND COMPARATIVE EXAMPLES 1 TO 2

After 4,4'-diaminodiphenylether (DDE) and terephthaloyl-m-aminoanilide (TMAA) were placed on such compositions as shown in Table 1 in a 5 l capacity separable glass reactor equipped with a stirrer, a thermometer and a nitrogen gas inlet, 3,000 gr. of N,N-dimethylacetoamide anhydride (DMAC) was added and the resultant mixture was agitated to obtain a uniform solution. It was cooled to −10° C. in a dry ice/acetone bath and 252.7 gr. (1.20 mole) of trimellitic acid monochloride anhydride (TMAC) was added dividedly in a small amount each time at such a rate that the temperature of the polymer system is kept at −10° to −5° C. The resultant mixture was agitated at a temperature of 0° C. for one hour and next 121.4 gr. (1.20 mole) of triethylamine anhydride was added dividedly at a sufficient rate for keeping the polymer system at a temperature less than about 5° C. After the resultant mixture was agitated for 2 hours, 150 ml of pyridine and 300 ml (about 3.2 mole) of acetic anhydride were added, and the resultant solution was agitated overnight at room temperature.

Next a polymer was precipitated in a state of powder by gradually throwing the polymerization finish solution into the water being agitated at a high speed, washed with water sufficiently and dehydrated, dried in a hot-air drier at a temperature of 150° C. for 5 hours and at a temperature of 200° C. for 3 hours to obtain a polymer powder having such a logarithmic viscosity ($\eta$inh), glass transition temperature (Tg) and melt viscosity ($\mu$a) as shown in "the characteristics of the polymers on the completion of polymerization" of Table 1.

The copolymer obtained in Example 1 is represented by the following theoretical structural and molecular formulae:

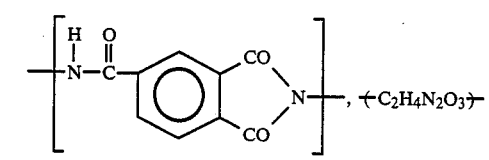

(1)

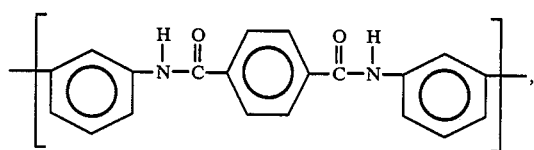

(2)

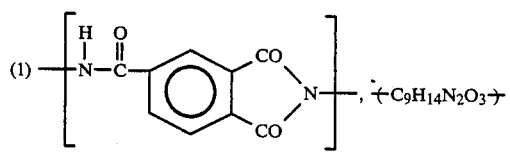

(3)

(1)/(2)/(3) = 1.20/0.36/0.84 (molar ratio)
= 100/30/70 (molar ratio)

units (1) and (2) or (3) being alternately interconnected. The results of element analysis of the copolymer agreed well with their theoretical values as shown in Table 2.

The results of element analysis of the polymers of Examples 2, 3 and 4 also agreed well with their theoretical values.

Next, 2% by weight of tetrafluoroethylene resin (Afron-polymist F-5 produced by Asahi Glass Co., Ltd.) as an anti-scorching agent was added to the obtained copolymer powder and the resultant mixture was supplied to Brabender Plast-graph extruder (treatment temperatures 300° to 360° C.) to obtain melt-extrusion pellets.

However, the polymer powders of Comparative Examples 1 and 2 could not pelletized by melt mixing/extrusion because the both have an abnormally-high melt viscosity.

The pellets were compression molded (treatment temperatures 330° to 360° C., pressures 50 to 100 kg/cm$^2$) to manufacture testpieces. They were dried in a hot-air drier at 150° C. for 24 hours and heat treated at 220° C. for 10 hours, at 245° C. for 14 hours and 260° C. for 48 hours. The results of measuring their physical properties were such as shown in column "the characteristics of moldings" of Table 1.

TABLE 1

|  | Quantity and composition of used diamine DDE/TMAA (g/g) (molar ratio) | Characteristics of the polymers on the completion of polymerization | | | Characteristics of moldings | | | |
|---|---|---|---|---|---|---|---|---|
|  |  |  |  |  | As molded | Heat treated | | |
|  |  | $\eta_{inh}$ | Tg (°C.) | $\mu_a$ (poise) | FS (kg/cm$^2$) | Tg (°C.) | HDT (°C.) | FS (kg/cm$^2$) |
| Example 1 | 168.2/124.7 (70/30) | 0.68 | 288 | 2.2 × 10$^4$ | 1,400 | 302 | 287 | 2,320 |
| Example 2 | 192.3/83.1 (80/20) | 0.78 | 286 | 2.0 × 10$^4$ | 1,450 | 301 | 287 | 2,290 |
| Example 3 | 216.2/41.6 (90/10) | 0.86 | 281 | 4.0 × 10$^5$ | 1,200 | 295 | 282 | 2,340 |
| Example 4 | 144.2/166.2 (60/40) | 0.62 | 289 | 3.3 × 10$^4$ | 1,550 | 303 | 288 | 2,350 |
| Comparative example 1 | 240.3/0 (100/0) | 0.96 | 259 | more than 10$^6$ | No moldings were obtained because neither melting nor kneading was possible. | | | |
| Comparative example 2 | 0/415.6 (0/100) | 0.45 | 307 | more than 10$^6$ | | | | |

TABLE 2

| | Results of analyzing elements | |
|---|---|---|
| | Measured value (% by wt.) | Theoretical value (% by wt.) |
| C | 70.1 | 70.24 |
| H | 3.6 | 3.45 |
| N | 9.5 | 9.10 |
| O | 16.8 | 17.21 |

EXAMPLES 5 AND 6

Table 3 shows the results of measuring the characteristics before and after heat treatment of the testpieces obtained by the same polymerization, post-treatment, blending, extrusion and compression molding as Example 1 except using material diamines having such a composition as shown therein.

The polymer of Example 5 is represented by the following theoretical formulae. The results of element analysis agreed well with their theoretical values.

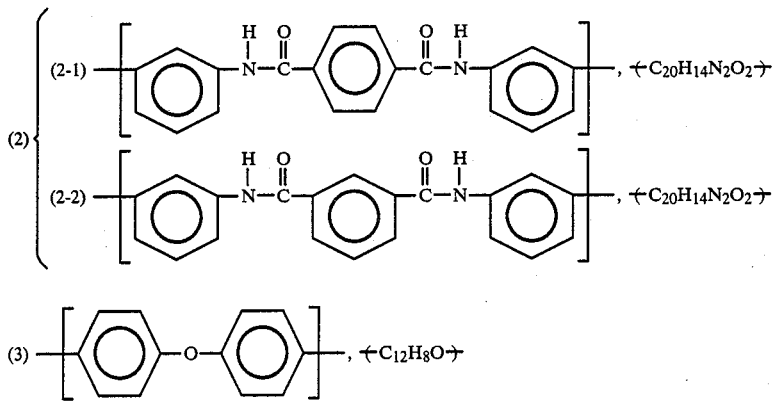

(1)/(2-1)/(2-2)/(3) = 1.20/0.18/0.18/0.84 (molar ratio)

TABLE 3

|  | Quantity and composition of used diamine DDE/TMAA/IMAA (g/g/g) (molar ratio) | Characteristics of the polymers on the completion of polymerization | | | Characteristics of moldings | | | |
|---|---|---|---|---|---|---|---|---|
|  |  |  |  |  | As molded | | Heat treated | |
|  |  | ηinh | Tg (°C.) | μa (poise) | FS (kg/cm²) | Tg (°C.) | HDT (°C.) | FS (kg/cm²) |
| Example 5 | 168.3/62.4/62.4 (70/15/15) | 0.65 | 285 | 1.9 × 10⁴ | 1,350 | 301 | 289 | 2,300 |
| Example 6 | 168.3/0/124.7 (70/0/30) | 0.54 | 283 | 1.4 × 10⁴ | 1,280 | 300 | 287 | 2,290 |

EXAMPLE 7

Supplied to the same apparatus as mentioned in Example 1 were 77.9 gr. (0.72 mole) of methaphenylenediamine (MPDA), 72.9 gr. (0.72 mole) of triethylamine and 3,000 gr. of DMAC, and the resultant mixture was agitated to obtain a uniform solution. The resultant reaction product was cooled in an ice bath, and 73.1 gr. (0.36 mole) of powdery TPC was added dividedly in a small amount each time at such a rate that its internal temperature did not exceed 30° C., and after the completion of addition, the resultant mixture was further subjected to reaction at a temperature of 10° C. for 1 hour. As the result, a forerunner diamine containing mainly TMAA was synthesized. Next 168.2 gr. (0.84 mole) of DDE was added and dissolved, and 252.7 gr. (1.20 mole) of powdery TMAC was added dividedly in a small amount each time at such a rate that its internal temperature did not exceed 30° C. and the resultant mixture was agitated at a temperature of 30° C. for 1 hour to complete its polymerization reaction.

Next the polymerization finish solution was gradually thrown into the water being agitated at a high speed to precipitate a powdery polymer. It was washed sufficiently and dehydrated and dried in a hot air drier at 150° C. for 5 hours and at 220° C. for 3 hours to obtain a polymer powder with ηinh=0.66, Tg=289° C., μa=2.3×10⁴ poise.

Next, 3% by weight of titanium dioxide was added to the polymer powder and the resultant mixture was supplied to an Brabender Plast-graph extruder (treatment temperature 300° to 360° C.) to obtain a melt-extrusion pellet. The pellet was subjected to a small-sized injection molding machine (treatment temperature 300° to 350° C., injection pressure 1,400 to 1,700 kg/cm²) to obtain molded testpieces. They were put in a hot-air drier, and heat teated at 200° C. for 24 hours, at 250° C. for 24 hours and at 260° C. for 24 hours. The following results were obtained by measuring their physical properties: FS—1,390 kg/cm² (as molded), 2,300 kg/cm² (heat treated), and HDT=285° C. (heat treated).

EXAMPLE 8

A polymer having:
Characteristics of the polymer on the completion of polymerization:
ηinh=0.58
Tg=290° C.
μa=2.0×10⁴ poise
Characteristics of moldings:
FS=1,400 kg/cm² (as molded); 2,380 kg/cm² (heat treated)
HDT=291° C. (heat treated)
was obtained by the same procedure as described in Example 7 except that the quantities of MPDA, TPC, DDE and TMAC were changed to 77.9 gr. (0.72 mole), 109.6 gr. (0.54 mole), 144.2 gr. (0.72 mole) and 189.5 gr. (0.90 mole).

EXAMPLE 9

Supplied to the same apparatus as mentioned in Example 1 were 318 gr. (0.6 mole) IPEA synthesized in Production example 3, 64.9 gr. (0.6 mole) of MPDA and 3,000 gr. of N-methyl-2-pyrrolidone, and the resultant mixture was agitated to obtain a uniform solution. The resultant reaction product was cooled in an ice bath and 252.7 gr. (1.20 mole) of a trimellic acid monochloride anhydride was added dividedly in a small amount each time at such a rate that its internal temperature did not exceed 30° C., and the resultant mixture was further agitated at 30° C. for 1 hour. The resultant reaction product was subjected to post-treatment, extrusion and molding same as in the latter part of Example 6 to obtain molded testpieces. They were put in a hot-air drier, and heat treated at 165° C. for 24 hours, at 245° C. for 24 hours and at 260° C. for 48 hours. The following results were obtained by measuring their physcial properties:

$\mu a = 2.1 \times 10^4$ poise

FS=1,250 kg/cm$^2$ (as molded); 2,160 kg/cm$^2$ (heat treated)

HDT=289° C. (heat treated)

EXAMPLES 10 AND 11

Supplied to the same apparatus as mentioned in Example 1 were 4,000 gr. of DMAC and such two kinds of diamine as shown in Table 4 and the resultant mixture was agitated to obtain a uniform solution. The resultant reaction mixture was cooled in an ice bath, and 91.4 gr. (0.45 mole) of powdery TPC and 30.5 gr. (0.15 mole) of IPC were added dividedly in a small amount each time at such a rate that its internal temperature did not exceed 30° C. The mixture was subjected to the reaction at 10° to 30° C. for 30 minutes. Then, 189.5 g (0.90 mole) of powdery TMAC was added dividedly in a small amount each time at such a rate that its internal temperature did not exceed 30° C. and the resultant mixture was further agitated at 30° C. for 1 hour to complete its polymerization reaction.

Next, the resultant polymerization finish solution was thrown gradually into the water being agitated at a high speed to precipitate a powdery polymer. The resultant reaction product was washed sufficiently/dehydrated and dried in a hot-air drier at 150° C. for 5 hours and at 220° C. for 3 hours.

The polymer was composed of such theoretical structure units as shown in Table 4 and the results of element analysis agreed well with their theoretical values. It was compression molded (treatment temperature: 330° to 400° C., pressure 50 to 100 kg/cm$^2$) to obtain testpieces. They were heat treated at 200° C. for 24 hours, at 250° C. for 24 hours and at 260° C. for 24 hours. Such results as shown in Table 4 were obtained by measuring their physical properties.

TABLE 4

| Example No. | Kinds and compositions of diamines used | | Formula of theoretical structural units, logarithmic viscosity (ηinh) and melt viscosity (μa) of copolymer | Flexural strength of moldings (kg/cm²) | |
|---|---|---|---|---|---|
| | 1st component | 2nd component | | As molded | Heat treated |
| 10 | Methaphenylenediamine 54.1 g (0.5 mole) | 4,4'-sulfonyl-bis(paraphenyleneoxy)dianiline 432 g (1.0 mole) |  $\eta ihn = 0.56$ $\mu a = 1.2 \times 10^4$ (poise) = 0.5/1 molar ratio | 1,350 | 2,240 |
| 11 | Methaphenylenediamine 97.3 g (0.9 mole) | 4,4'-2,2-propylidenebis-(paraphenyleneoxy)dianiline 246 g (0.6 mole) | 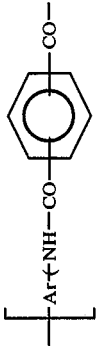 $\eta ihn = 0.51$ $\mu a = 1.3 \times 10^4$ (poise) = 0.9/0.6 molar ratio | 860 | 1,800 |

COMPARATIVE EXAMPLES 3 TO 7

Supplied to the same apparatus as mentioned in Example 1 were 3000 g of DMAc and such two kinds of diamines as shown in Table 5 and the resultant mixture was agitated to obtain a uniform solution. This reaction mixture was cooled to 10° C. in an ice bath and trimellitic anhydride acid chloride (TMAC) 210.6 g (1.0 mol) was added gradually to maintain the temperature under 30° C. After addition of all TMAC, the reaction mixture was maintained at 30° C. for 2 hours.

Next, the polymerization solution was poured gradually into vigorously stirred water. Then the precipitated polymer was washed/dehydrated well, and dried at 150° C. for one night, followed by 200° C. for 5 hours in a circulating air oven to obtain a polymer powder having such a logarithmic viscosity and melt viscosity as shown in Table 5. The polymer was composed of such theoretical structure units as shown in Table 5 and the results of element analysis agreed well with their theoretical values.

Next, 0.5% by weight of tetrafluoroethylene resin and 3% by weight of titanium dioxide were very well mixed with the obtained polymer powder by the Henschell mixer, and the resultant mixture was supplied to Brabender plast-graph extruder at temperatures of 300° to 350° C. to obtain melt-extrusion pellets. The pellets were injection molded under conditions same as Example 7 to obtain molded testpieces. They were heat treated at 200° for 24 hours, at 250° C. for 24 hours and at 260° C. for 24 hours. Such results as shown in Table 5 were obtained by measuring their physical properties. They have poor flexural strength under 500 kg/cm² as molded and there was no sufficient improvement even if heat treated.

TABLE 5

| Comparative example No. | Kinds and compositions of diamines used | | Formula of theoretical structural units of copolymer | $\eta_{inh}$ | $\mu_a$ (poise) | Flexural strength of moldings (kg/cm²) | |
|---|---|---|---|---|---|---|---|
| | 1st component | 2nd component | | | | As molded | Heat treated |
| 3 | TMAA 138.5 g (0.4 mol) | MPDA 64.9 g (0.6 mol) | (1), (2), (3) structures; (1)/(2)/(3) = 100/40/60 (molar ratio) | 0.36 | more than 10⁶ | 250 | 300 |
| 4 | TMAA 138.5 g (0.4 mol) | 4,4'-diamino diphenylmethane 119.0 g (0.6 mol) | (1), (2), (3) structures with CH₂ bridge; (1)/(2)/(3) = 100/40/60 (molar ratio) | 0.59 | more than 10⁶ | 420 | 550 |

TABLE 5-continued

| Comparative example No. | Kinds and compositions of diamines used | | Formula of theoretical structural units of copolymer | $\eta_{inh}$ | $\mu_a$ (poise) | Flexural strength of moldings (kg/cm$^2$) | |
|---|---|---|---|---|---|---|---|
| | 1st component | 2nd component | | | | As molded | Heat treated |
| 5 | TMAA 138.5 g (0.4 mol) | 3,4'-benzanilide 136.3 g (0.6 mol) | (structures shown) (1)/(2)/(3) = 100/40/60 (molar ratio) | 0.42 | more than 10$^6$ | 300 | 350 |
| 6 | TMAA 138.5 g (0.4 mol) | 3,3'-benzanilide 136.3 g (0.6 mol) | (structures shown) (1)/(2)/(3) = 100/40/60 (molar ratio) | 0.38 | more than 10$^6$ | 380 | 420 |
| 7 | TMAA 138.5 g (0.4 mol) | IMAA 207.8 g (0.6 mol) | (structures shown) | 0.42 | more than 10$^6$ | 350 | 350 |

We claim:

1. A thermoplastic aromatic polyamideimide copolymer having recurring structural units represented by formulae

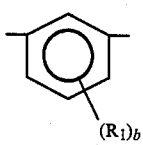  (1)

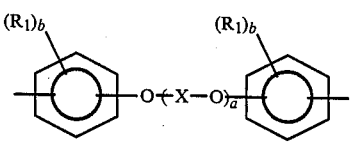 and  (2)

—Ar'—  (3)

(2) and (3) being at a ratio of 1 mole to 1 mole of (1), (3) being at a ratio of 0.95-0.05 mole to 0.05-0.95 mole of (2) respectively, (1) and (2) or (3) being alternately interconnected and Ar and Ar' being composed of 5 to 70 mole % of

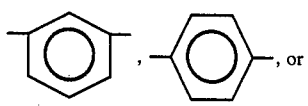

and 95 to 30 mole % of

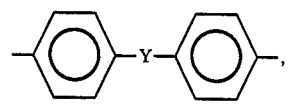

wherein Z is a trivalent aromatic group having two of its three carbonyl groups being attached to adjacent carbon atoms, X is

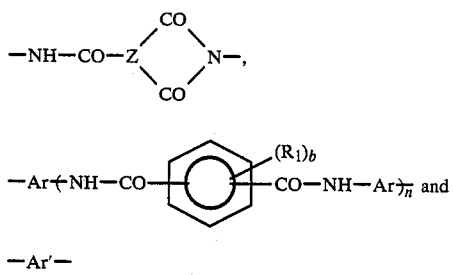

Y is a direct bond, or Y is —O—, —S—, —SO$_2$—,

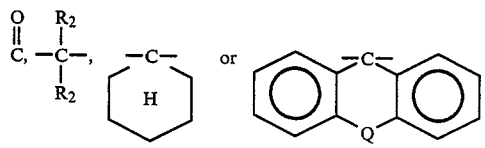

$R_1$ is a methyl group, $R_2$ is an alkyl group having 1 to 4 carbon atoms, a fluorine-substituted alkyl group or a phenyl group, Q is a direct bond, or Q is —CO—, —O—, —S— or —CH$_2$—, a is 0 or an integer from 1 to 4, b is 0, 1 or 2, and n is an integer from 1 to 500, and having a flexural strength more than 600 kg/cm$^2$ as molded and melt viscosity less than 10$^6$ poise measured at the shear rate of 10$^3$ sec$^{-1}$ and at the temperature of 360° C.

2. A thermoplastic aromatic polyamideimide copolymer according to claim 1 having a flexural strength of more than 800 kg/cm$^2$ as molded.

3. A thermoplastic aromatic polyamideimide copolymer according to claim 1 having a flexural strength more than 1000 kg/cm$^2$ as molded.

4. A thermoplastic aromatic polyamideimide copolymer according to claim 1, wherein said Ar is

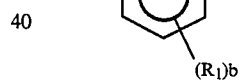

5. A thermoplastic aromatic polyamideimide copolymer according to claim 1, whein said Ar is

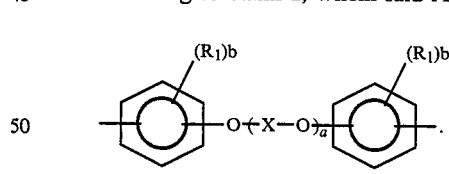

6. A thermoplastic aromatic polyamideimide copolymer according to claim 1, wherein said Ar' is

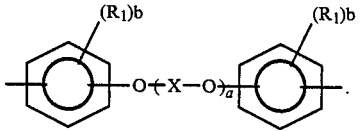

7. A thermoplastic aromatic polamideimide copolymer according to claim 1, wherein said n is a mixture of 1 to 10.

8. A thermoplastic aromatic polyamideimide copolymer according to claim 1, wherein said n is 1.

9. A thermoplastic aromatic polyamideimide copolymer according to claim 4, wherein said n is a mixture of 1 to 10.

10. A thermoplastic aromatic polyamideimide copolymer according to claim 4, wherein said n is 1.

11. A thermoplastic aromatic polyamideimide copolymer according to claim 1, wherein said z is

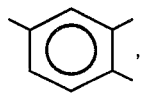

said

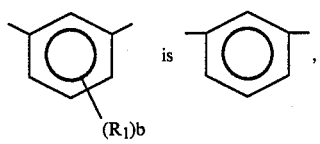 is said

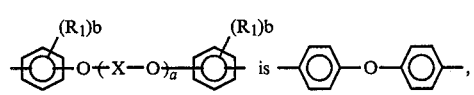

12. A thermoplastic aromatic polyamideimde copolymer according to claim 11, wherein said

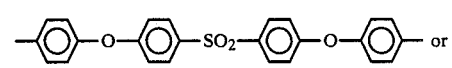 is

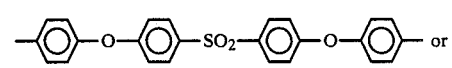

13. A thermoplastic aromatic polyamideimide copolymer according to claim 4, wherein said z is

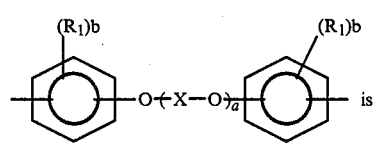

said unit B is

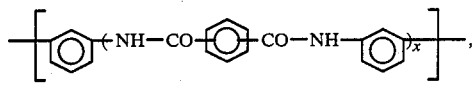

said

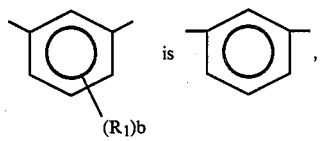 is and said

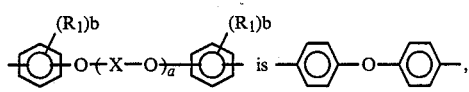 is 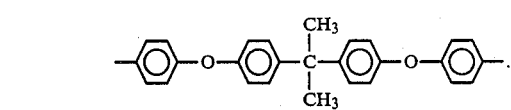

14. A thermoplastic aromatic poyamideimide copolymer according to claim 13, wherein said

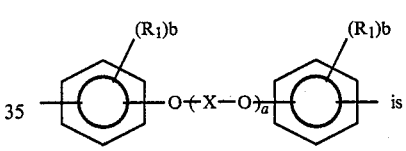 is

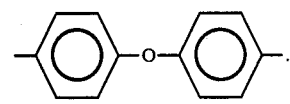

15. A thermoplastic aromatic polyamideimide copolymer according to claim 4, wherein said z is

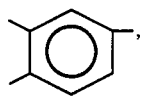

said unit (2) is

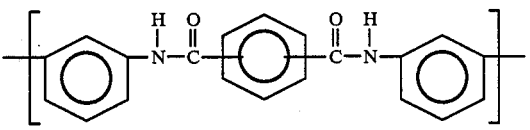

and said unit (3) is

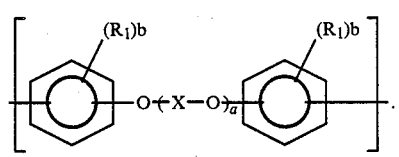

* * * * *